United States Patent
Ishii et al.

(10) Patent No.: US 11,381,709 B2
(45) Date of Patent: Jul. 5, 2022

(54) IMAGE READING DEVICE AND IMAGE FORMING APPARATUS INCORPORATING SAME

(71) Applicants: Tatsuya Ishii, Kanagawa (JP);
Kohtaroh Oda, Kanagawa (JP);
Tetsuya Ofuchi, Kanagawa (JP);
Tomoaki Suga, Kanagawa (JP);
Yukifumi Kobayashi, Kanagawa (JP)

(72) Inventors: Tatsuya Ishii, Kanagawa (JP);
Kohtaroh Oda, Kanagawa (JP);
Tetsuya Ofuchi, Kanagawa (JP);
Tomoaki Suga, Kanagawa (JP);
Yukifumi Kobayashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/148,939

(22) Filed: Jan. 14, 2021

(65) Prior Publication Data
US 2021/0266423 A1    Aug. 26, 2021

(30) Foreign Application Priority Data

Feb. 20, 2020 (JP) .............................. JP2020-027443
Nov. 6, 2020 (JP) .............................. JP2020-186006

(51) Int. Cl.
*H04N 1/409* (2006.01)
*H04N 1/00* (2006.01)
*H04N 1/04* (2006.01)

(52) U.S. Cl.
CPC ....... *H04N 1/4095* (2013.01); *H04N 1/00018* (2013.01); *H04N 1/04* (2013.01)

(58) Field of Classification Search
CPC ..... H04N 1/4095; H04N 1/00018; H04N 1/04
See application file for complete search history.

(56) References Cited

U.S. PATENT DOCUMENTS

| | | | | |
|---|---|---|---|---|
| 6,637,329 | B1 * | 10/2003 | Madeley | G03F 7/2055 101/463.1 |
| 6,941,083 | B1 * | 9/2005 | Muratani | G03G 15/235 399/49 |
| 9,906,668 | B2 * | 2/2018 | Takahashi | H04N 1/0032 |
| 2003/0133000 | A1 * | 7/2003 | Conrow | B41J 11/008 347/116 |

(Continued)

FOREIGN PATENT DOCUMENTS

| | | | | |
|---|---|---|---|---|
| EP | 3546400 | | 10/2019 | |
| EP | 3546400 | A1 * | 10/2019 | ........ B41J 11/0095 |
| JP | 2016-139026 | | 8/2016 | |

OTHER PUBLICATIONS

Extended European Search Report for 21154756.7 dated Jun. 25, 2021.

*Primary Examiner* — Ted W Barnes
(74) *Attorney, Agent, or Firm* — IPUSA, PLLC

(57) ABSTRACT

An image reading device includes a first scanner, a second scanner, and circuitry. The first scanner is configured to read a first side of a recording medium. The second scanner is configured to read a second side of the recording medium. The circuitry is configured to generate a first correction value to correct misalignment between the first side and the second side. The circuitry is configured to input a second correction value. The circuitry is configured to correct an image based on the first correction value and the second correction value.

14 Claims, 12 Drawing Sheets

(56) References Cited

U.S. PATENT DOCUMENTS

| | | | |
|---|---|---|---|
| 2004/0086288 A1* | 5/2004 | Wibbels | G03G 15/234 399/45 |
| 2004/0190927 A1* | 9/2004 | Tsukamoto | G03G 15/5095 399/82 |
| 2005/0286922 A1* | 12/2005 | Oki | H04N 1/047 399/75 |
| 2006/0120748 A1 | 6/2006 | Takehara et al. | |
| 2009/0269091 A1* | 10/2009 | Yuasa | G03G 15/238 399/45 |
| 2010/0020364 A1* | 1/2010 | Kerxhalli | H04N 1/4095 358/474 |
| 2011/0019246 A1* | 1/2011 | Kondo | H04N 1/00034 358/448 |
| 2015/0151938 A1* | 6/2015 | Matsumoto | H04N 1/00724 358/1.12 |
| 2015/0186762 A1* | 7/2015 | Nishimura | B41J 11/009 358/498 |
| 2015/0293487 A1* | 10/2015 | Takenaga | G03G 15/5062 356/73 |
| 2016/0090256 A1* | 3/2016 | Nakayama | G01B 11/06 271/265.04 |
| 2016/0219172 A1* | 7/2016 | Mita | H04N 1/00713 |
| 2016/0234398 A1* | 8/2016 | Itou | H04N 1/0432 |
| 2016/0269598 A1* | 9/2016 | Hayashi | H04N 1/00087 |
| 2016/0277610 A1* | 9/2016 | Kishi | H04N 1/0032 |
| 2016/0313693 A1 | 10/2016 | Fujiya et al. | |
| 2016/0373603 A1* | 12/2016 | Ooishi | G03G 15/04 |
| 2017/0034392 A1* | 2/2017 | Suga | H04N 1/387 |
| 2017/0094126 A1* | 3/2017 | Isokawa | H04N 1/6044 |
| 2017/0104888 A1* | 4/2017 | Nomura | H04N 1/00761 |
| 2017/0131671 A1* | 5/2017 | Nishimura | G03G 15/043 |
| 2017/0176908 A1* | 6/2017 | Kobayashi | G03G 15/50 |
| 2017/0223204 A1* | 8/2017 | Ooishi | H04N 1/00588 |
| 2017/0223206 A1* | 8/2017 | Katagiri | H04N 1/00042 |
| 2017/0277100 A1* | 9/2017 | Xu | H04N 1/00602 |
| 2018/0048788 A1* | 2/2018 | Hayashi | H04N 1/6033 |
| 2018/0081317 A1* | 3/2018 | Kasuga | G03G 15/6582 |
| 2018/0084135 A1* | 3/2018 | Kasuga | G03G 15/0266 |
| 2018/0109687 A1* | 4/2018 | Toyoizumi | H04N 1/00082 |
| 2018/0139339 A1* | 5/2018 | Xu | G03G 15/5062 |
| 2018/0159989 A1* | 6/2018 | Mizuno | G03G 15/234 |
| 2018/0288259 A1* | 10/2018 | Mizuno | H04N 1/00809 |
| 2019/0089870 A1* | 3/2019 | Sakatani | H04N 1/00092 |
| 2019/0158682 A1* | 5/2019 | Andersen | H04N 1/00015 |
| 2019/0166274 A1* | 5/2019 | Ishii | H04N 1/00774 |
| 2019/0171137 A1* | 6/2019 | Kobayashi | H04N 1/0057 |
| 2019/0171154 A1* | 6/2019 | Kobayashi | G03G 15/6558 |
| 2019/0300310 A1* | 10/2019 | Ishii | H04N 1/00785 |
| 2019/0354755 A1* | 11/2019 | Miyauchi | G06V 10/243 |
| 2020/0106907 A1* | 4/2020 | Hirano | H04N 1/00811 |
| 2020/0254782 A1* | 8/2020 | Kawai | B41J 11/008 |
| 2020/0264546 A1* | 8/2020 | Kobayashi | G03G 15/6567 |
| 2021/0281711 A1* | 9/2021 | Yana | B41J 29/42 |

* cited by examiner

IMAGE READING DEVICE AND IMAGE FORMING APPARATUS INCORPORATING SAME

CROSS-REFERENCE TO RELATED APPLICATIONS

This patent application is based on and claims priority pursuant to 35 U.S.C. § 119(a) to Japanese Patent Application Nos. 2020-027443, filed on Feb. 20, 2020, and 2020-186006, filed on Nov. 6, 2020, in the Japan Patent Office, the entire disclosure of each of which is hereby incorporated by reference herein.

BACKGROUND

Technical Field

Embodiments of the present disclosure relate to an image reading device and to an image forming apparatus incorporating the image reading device.

Related Art

There has been known a way of adjusting the positions of images to be formed on the front and back sides of a recording medium to match the positions with each other.

SUMMARY

In one embodiment of the present disclosure, a novel image reading device includes a first scanner, a second scanner, and circuitry. The first scanner is configured to read a first side of a recording medium. The second scanner is configured to read a second side of the recording medium. The circuitry is configured to generate a first correction value to correct misalignment between the first side and the second side. The circuitry is configured to input a second correction value. The circuitry is configured to correct an image based on the first correction value and the second correction value.

Also described is a novel image forming apparatus incorporating the image reading device.

BRIEF DESCRIPTION OF THE DRAWINGS

A more complete appreciation of the embodiments and many of the attendant advantages and features thereof can be readily obtained and understood from the following detailed description with reference to the accompanying drawings, wherein.

The accompanying drawings are intended to depict embodiments of the present disclosure and should not be interpreted to limit the scope thereof. Also, identical or similar reference numerals designate identical or similar components throughout the several views.

DETAILED DESCRIPTION

Figure 1:
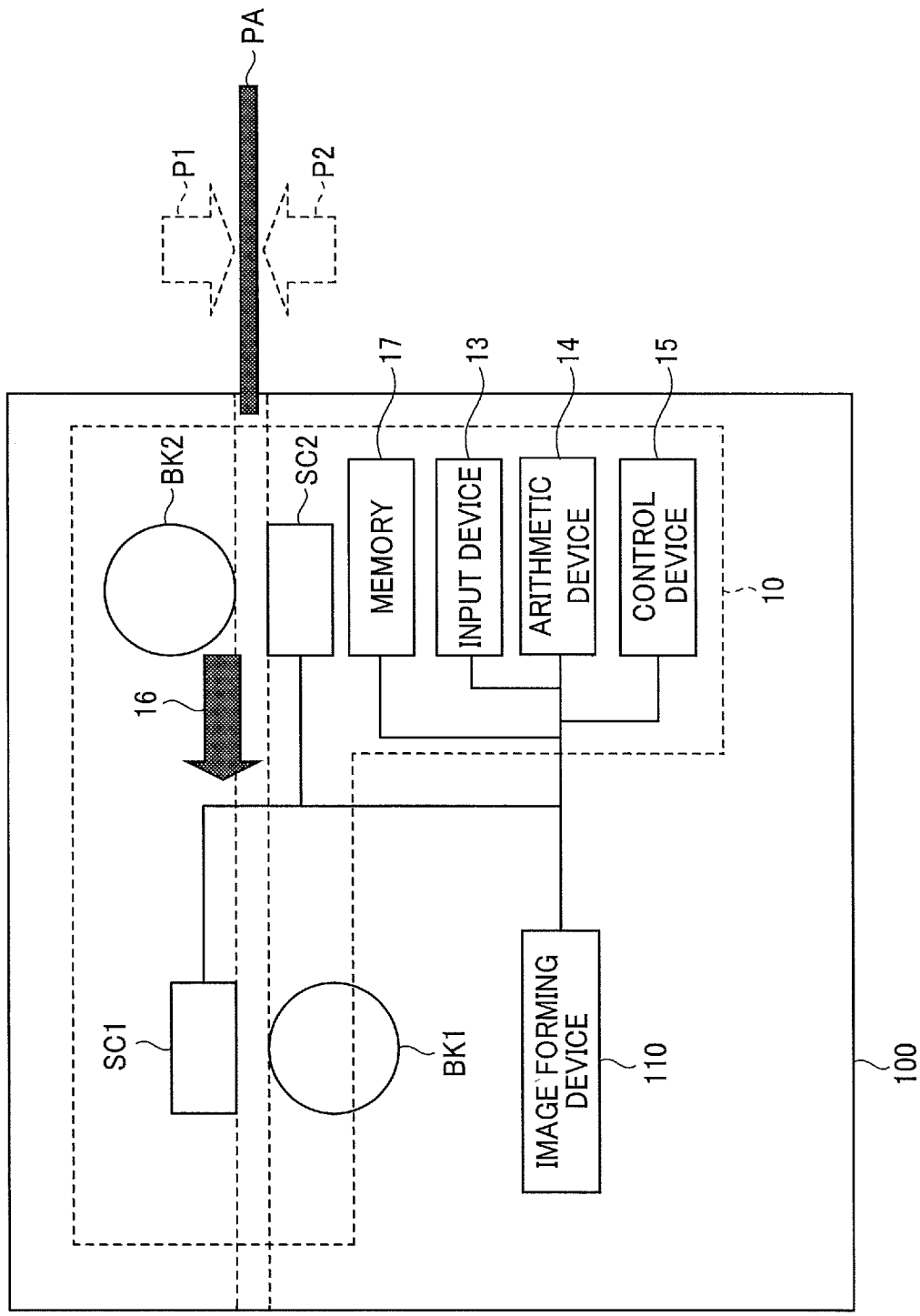
FIG. 1 is a diagram illustrating an image forming apparatus including an image reading device according to an embodiment of the present disclosure.

In describing embodiments illustrated in the drawings, specific terminology is employed for the sake of clarity. However, the disclosure of the present specification is not intended to be limited to the specific terminology so selected and it is to be understood that each specific element includes all technical equivalents that have a similar function, operate in a similar manner, and achieve a similar result.

Although the embodiments are described with technical limitations with reference to the attached drawings, such description is not intended to limit the scope of the disclosure and not all of the components or elements described in the embodiments of the present disclosure are indispensable to the present disclosure.

In a later-described comparative example, embodiment, and exemplary variation, for the sake of simplicity, like reference numerals are given to identical or corresponding constituent elements such as parts and materials having the same functions, and redundant descriptions thereof are omitted unless otherwise required.

As used herein, the singular forms "a," "an," and "the" are intended to include the plural forms as well, unless the context clearly indicates otherwise.

It is to be noted that, in the following description, suffixes Y, M, C, and K denote colors of yellow, magenta, cyan, and black, respectively. To simplify the description, these suffixes are omitted unless necessary.

Referring to the drawings, wherein like reference numerals designate identical or corresponding parts throughout the several views, embodiments of the present disclosure are described below.

Now, a description is given of a first embodiment of the present disclosure.

Initially with reference to FIG. 1, a description is given of an overall configuration of an image reading device and an image forming apparatus.

FIG. 1 is a diagram illustrating an image forming apparatus including an image reading device.

Hereinafter, as illustrated in FIG. 1, an image forming apparatus 100 including an image reading device 10 will be described as an example. However, the image reading device 10 and the image forming apparatus 100 are not limited to the configuration illustrated in FIG. 1. The image reading device 10 and the image forming apparatus 100 may be separate components. Incidentally, in the following examples, a sheet PA serves as a recording medium on which an image is formed. The image forming apparatus 100 is, e.g., a copier or a multifunction peripheral (MFP).

For example, the image forming apparatus 100 has a hardware configuration including hardware resources such as a first scanner SC1, a second scanner SC2, an image forming device 110, an input device 13, an arithmetic device 14, a control device 15, and a memory 17.

The first scanner SC1 reads a first side P1 of the sheet PA.

The second scanner SC2 reads a second side P2 of the sheet PA.

Each of the first scanner SC1 and the second scanner SC2 includes, e.g., an optical sensor and a lens.

The input device 13 is, e.g., a touch panel. Note that the input device 13 may be an interface that exchanges data with an external device through wired or wireless communication and inputs various settings.

The arithmetic device 14 and the control device 15 are e.g., central processing units (CPUs). Specifically, the arithmetic device 14 executes processing according to, e.g., programs. The control device 15 controls the hardware resources. The memory 17 is, e.g., a device that stores data.

The image forming device 110 is a device that forms an image according to, e.g., output image data generated by the image reading device 10. For example, the image forming device 110 conveys recording media, performs image processing, and performs a series of image forming processes including an exposure process, a developing process, a transfer process, a fixing process, and a cleaning process, to form an image on a recording medium.

As illustrated in FIG. 1, the image forming apparatus 100 may include a first side background member BK1 and a second side background member BK2. For example, the first side background member BK1 and the second side background member BK2 are disposed at positions opposite the scanner SC1 and the scanner SC2, respectively, as illustrated in FIG. 1. The first side background member BK1 and the second side background member BK2 are members that serve as backgrounds when the scanner SC1 and the scanner SC2 read images, respectively. The first side background member BK1 and the second side background member BK2 are preferably configured to switch between different colors, for example, between a white surface and a black surface.

In the following example, the image forming apparatus 100 reads both sides of the sheet PA conveyed in a conveyance direction 16 (from right to left in FIG. 1).

Figure 2:
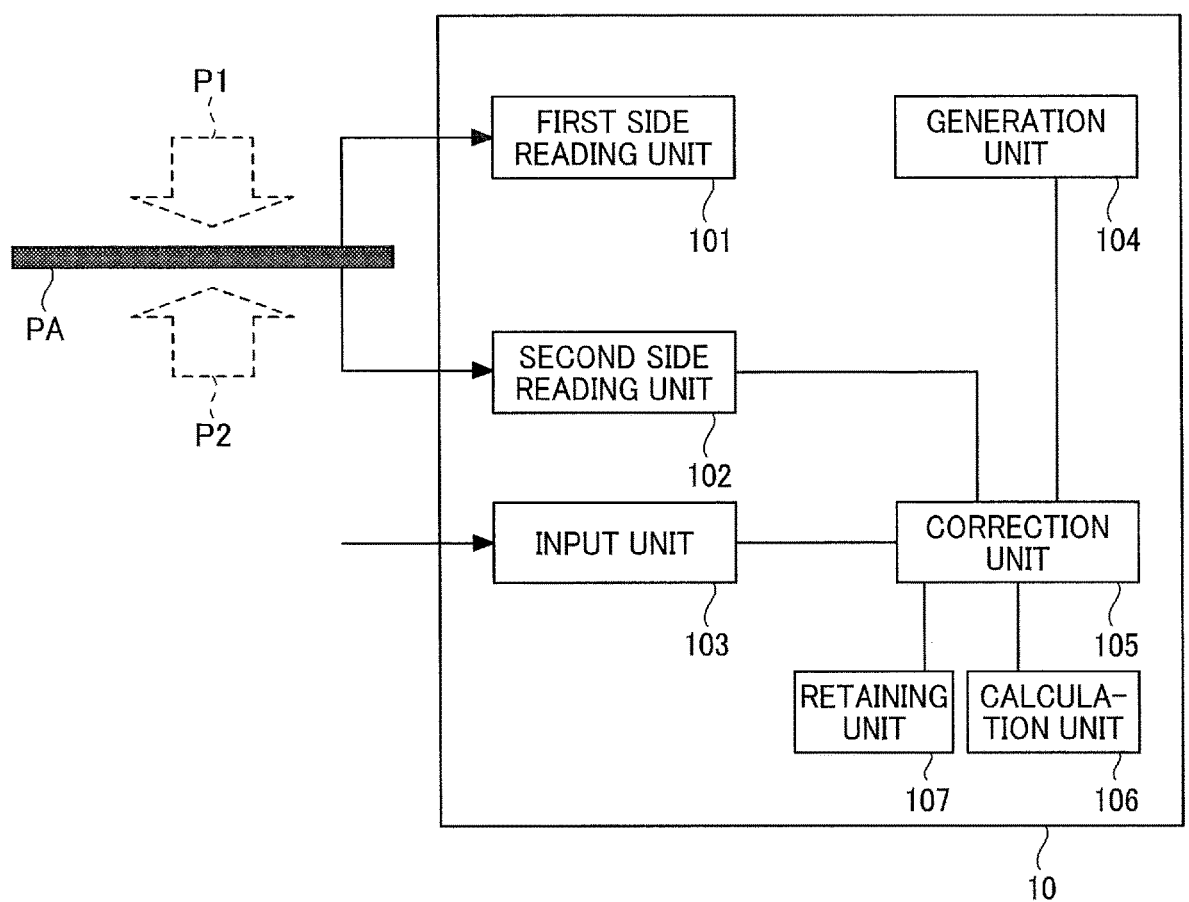
FIG. 2 is a diagram illustrating a functional configuration of the image reading device of FIG. 1.

Referring now to FIG. 2, a description is given of a functional configuration of the image reading device 10 described above.

FIG. 2 is a diagram illustrating an example of the functional configuration of the image reading device 10.

For example, the image reading device 10 includes, as functional units, a first side reading unit 101, a second side reading unit 102, an input unit 103, a generation unit 104, a correction unit 105, a calculation unit 106, and a retaining unit 107.

The first side reading unit 101 performs a first side reading process of reading the first side P1. For example, the first side reading unit 101 is implemented by the first scanner SC1.

The second side reading unit 102 performs a second side reading process of reading the second side P2. For example, the second side reading unit 102 is implemented by the second scanner SC2.

The input unit 103 performs an input process of inputting a second correction value. For example, the input unit 103 is implemented by the input device 13 or the arithmetic device 14.

The generation unit 104 performs a generation process of generating a first correction value. For example, the generation unit 104 is implemented by the input device 13 or the arithmetic device 14.

The correction unit 105 performs a correction process of correcting an image based on the first correction value and the second correction value. For example, the correction unit 105 is implemented by the arithmetic device 14.

For example, the calculation unit 106 is implemented by the arithmetic device 14. For example, the retaining unit 107 is implemented by the memory 17. A detailed description of the calculation unit 106 and the retaining unit 107 is deferred.

Figure 3:
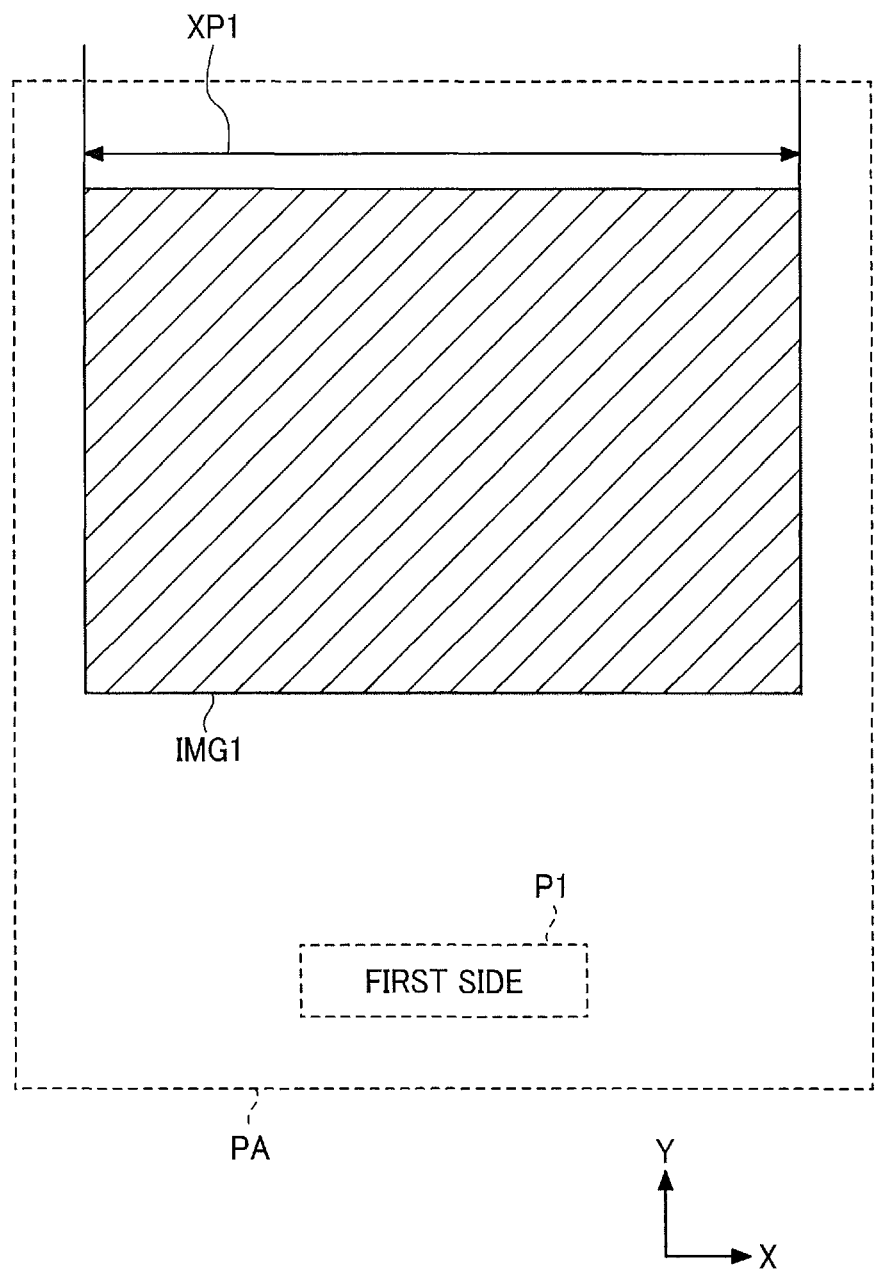
FIG. 3 is a diagram illustrating a result of reading a first side of a recording medium.

Referring now to FIG. 3, a description is given of an overall process.

For example, the first correction value is generated as follows. First, for example, the following reading is performed on the first side P1.

FIG. 3 is a diagram illustrating a result of reading a first side of a recording medium.

For example, a first image IMG1 is formed in advance on the first side P1 of the sheet PA. When the first side P1 is read, image data indicating the first image IMG1 is generated. Hereinafter, such image data indicating the first image IMG1 is referred to as "first side image data." The first image IMG1 is formed on a first side of another recording medium according to the first side image data.

In the following example, the size of the first image IMG1 in an X-axis direction (i.e., the lateral direction in FIG. 3) is referred to as a "first dimension XP1." In the following example, the X-axis direction is a width direction of a recording medium, which may be referred to as a main scanning direction; whereas a Y-axis direction is a longitudinal direction of a recording medium, which may be referred to as a sub-scanning direction.

In short, when the first side P1 is read, the first side image data is generated and the first dimension XP1 is obtained.

After the first side is read as described above, the following reading is performed on the same sheet PA, for example.

Figure 4:
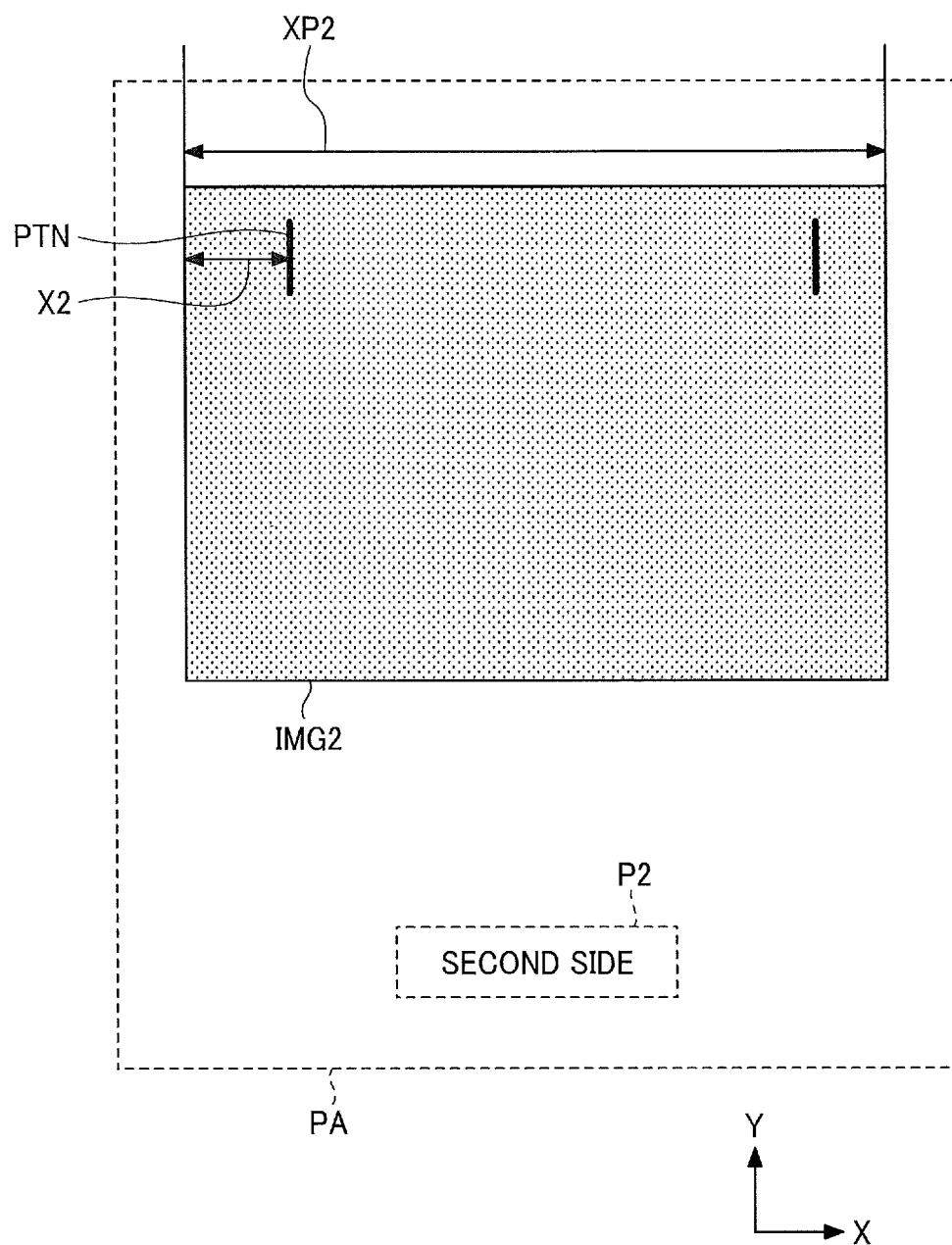
FIG. 4 is a diagram illustrating a result of reading a second side of the recording medium of FIG. 3.

FIG. 4 is a diagram illustrating a result of reading a second side of the recording medium of FIG. 3.

Similar to the first side P1, a second image IMG2 is formed in advance on the second side P2. When the second side P2 is read, image data indicating the second image IMG2 is generated. Hereinafter, such image data indicating the second image IMG2 is referred to as "second side image data." The second image IMG2 is formed on a second side of another recording medium according to the second side image data.

A pattern PTN, as an example of an object, is formed in advance on the second side P2. For example, the shape of the pattern PTN is preset in the image forming apparatus 100. Accordingly, when the second side image data includes the pattern PTN, the image forming apparatus 100 recognizes the pattern PTN by pattern matching, for example. The image forming apparatus 100 thus recognizes the pattern PTN to obtain, e.g., a distance from an end portion of the second image IMG2 to the pattern PTN. Hereinafter, such a distance from an end portion of the second image IMG2 to the pattern PTN is referred to as a "pattern distance X2."

In short, when the second side P2 is read, the second side image data is generated and the pattern distance X2 is obtained together with a second dimension XP2.

Next, based on the results of reading the first side and the second side, the image forming apparatus 100 (e.g., the generation unit 104 of the image reading device 10) calculates and generates the first correction value as follows, for example.

$$C1 = XP1/XP2 \tag{1}$$

Equation (1) is an equation indicating an example of generating a first correction value C1 that is used for correction of an image on the second side. Specifically, as indicated by Equation (1), the first correction value C1 is a value calculated based on, e.g., the ratio of the first dimension XP1 to the second dimension XP2. Then, the second side image data is corrected as follows based on the first correction value C1 calculated by Equation (1) and a second correction value C2.

$$X2A = X2 \times C1 \times C2 \quad (2)$$

Equation (2) indicates an example of correcting the pattern distance X2 in the image to be is formed on the second side. In a case in which the correction target (i.e., "X2A" in Equation (2)) is changed, "X2" in Equation (2) may be changed together with the correction target. Note that "X2A" represents the pattern distance X2 subjected to correction.

Specifically, the pattern distance X2 in Equation (2) is obtained based on the second side image data. The first correction value C1 in Equation (2) is obtained by Equation (1), for example.

A typical way often causes an error in magnification between the case of reading one side (e.g., the first side) of a recording medium and the case of reading another side (e.g., the second side) of the recording medium different from the first side of the recording medium.

The second correction value C2 in Equation (2) is, e.g., a correction value for correcting such a magnification difference of the first scanner SC1 and the second scanner SC2 with high accuracy. The second correction value C2 is, e.g., a value input in advance to the image reading device 10.

When the correction is performed based on Equation (2), the following correction result is obtained, for example.

Figure 5:
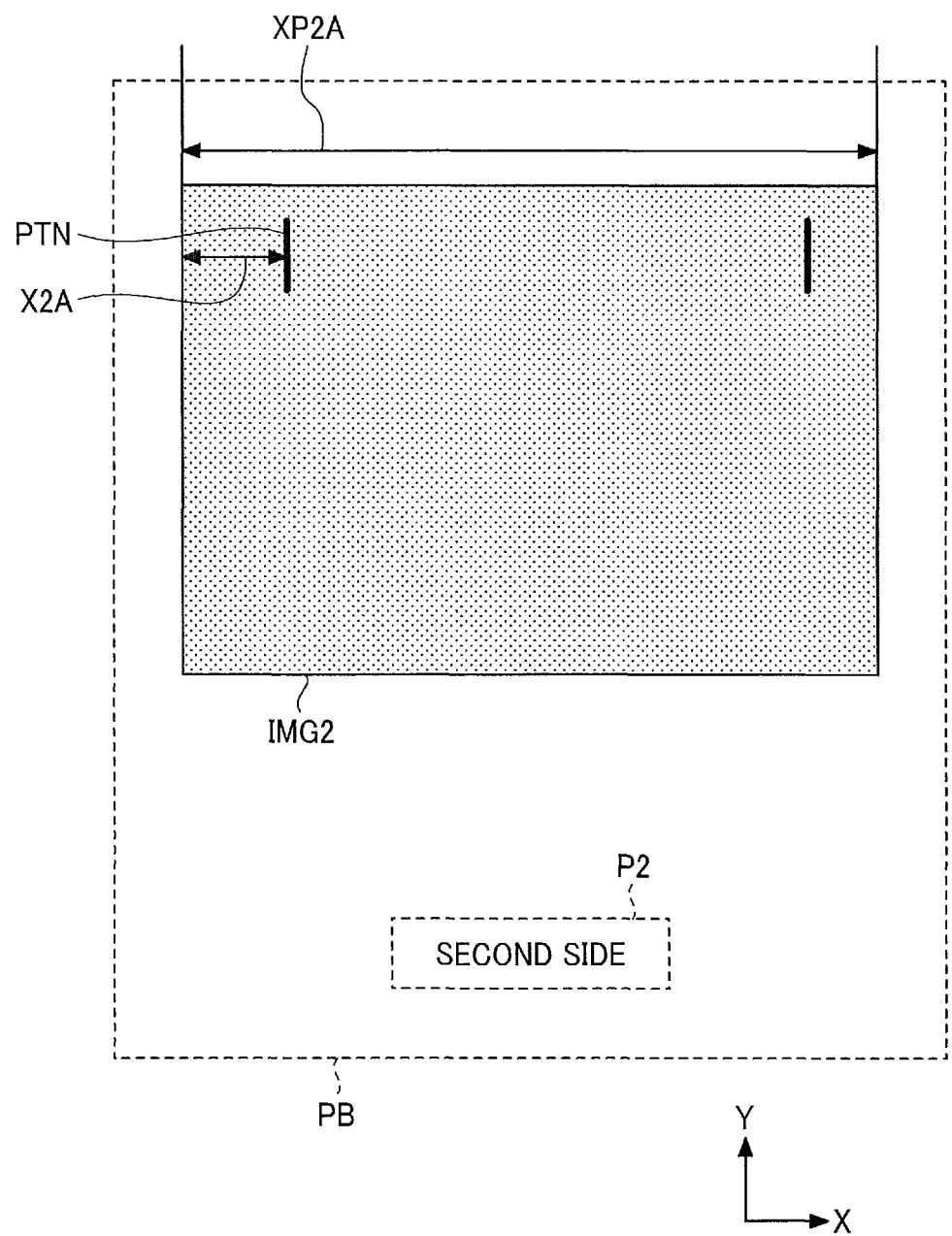
FIG. 5 is a diagram illustrating an example after correction.

FIG. 5 is a diagram illustrating an example after correction.

In the following example, an image is formed on a sheet PB, which is a recording medium different from the sheet PA, based on the result of correction, as illustrated in FIG. 5.

For example, the first image IMG1 is formed on the first side P1 of the sheet PB according to the first image data. By contrast, on the second side P2 of the sheet PB, an image is formed according to the result of correction based on Equation (2). For example, an image is formed with the pattern distance X2A and a second dimension XP2A, which are a corrected pattern distance X2 and a corrected second dimension XP2, respectively.

When the second correction value is thus input, the image is corrected in consideration of the second correction value. For example, as the second correction value, a user inputs a value intended in consideration of the magnification difference. When such a second correction value is input, the size is corrected as intended by the user. Even the difference that is difficult to correct with the first correction value alone is accurately corrected. Note that a value obtained by calculation based on given input values may be input as the second correction value.

The second correction value allows the user to finely adjust an image to be formed. Accordingly, variation in size of images formed are prevented.

The above processing is executed as follows, for example.

Figure 6:
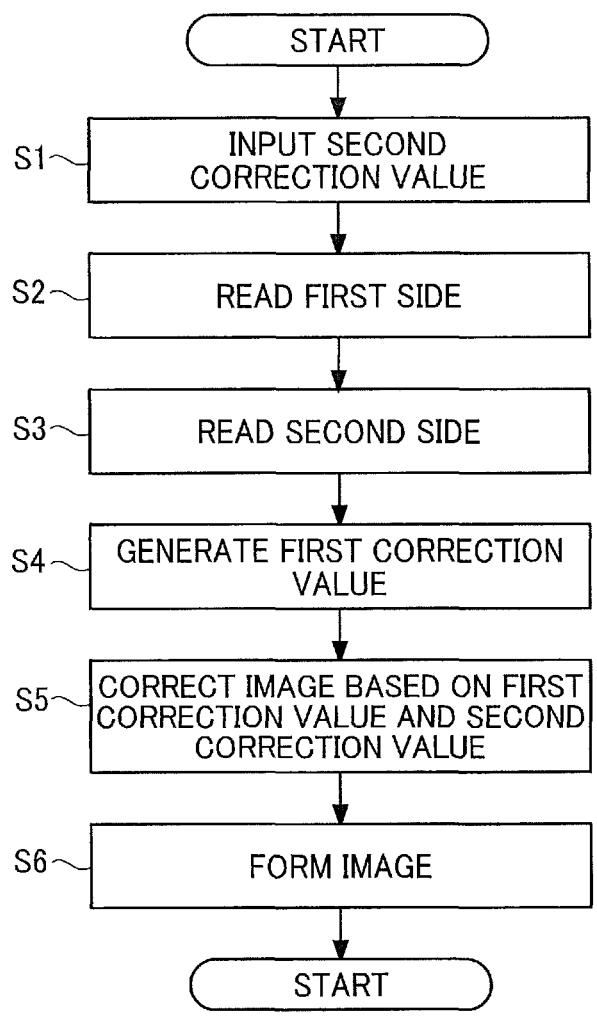
FIG. 6 is a flowchart of an overall process.

FIG. 6 is a flowchart of an overall process.

In step S1, the input unit 103 inputs the second correction value. That is, the second correction value is set in advance, for example. Note that the second correction value may be input by the time of correction (corresponding to step S5 at a subsequent stage). That is, the input timing is not limited to the timing illustrated in FIG. 6.

In step S2, the first side reading unit 101 reads the first side of a recording medium.

In step S3, the second side reading unit 102 reads the second side of the recording medium.

For example, when step S2 is performed, an image as illustrated in FIG. 3 is obtained as a reading result. Similarly, when step S3 is performed, an image as illustrated in FIG. 4 is obtained as a reading result.

In step S4, the generation unit 104 generates the first correction value. For example, in step S4, the first correction value is generated by calculation of Equation (1).

In step S5, the correction unit 105 corrects the image based on the first correction value and the second correction value. For example, the corrected dimension, that is, how to correct the image is specified by calculation of Equation (2). Specifically, for example, the image illustrated in FIG. 4 is corrected to the image illustrated in FIG. 5.

In step S6, the image forming device 110 of the image forming apparatus 100 forms an image on each side of another recording medium.

After the first side and the second side are read, image processing such as shading may be performed on the images in order to generate image data for each of the first side and the second side.

Figure 7:
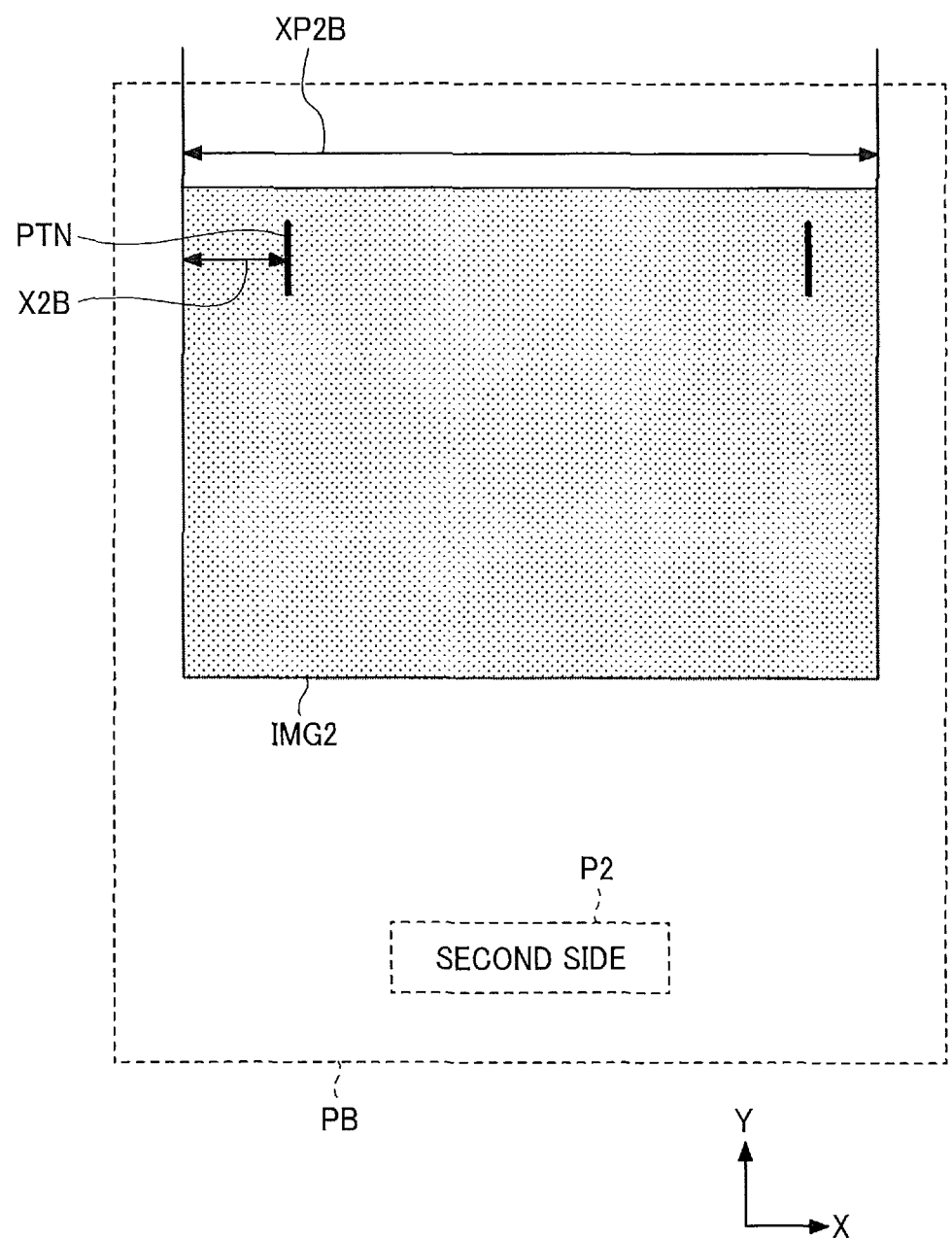
FIG. 7 is a diagram illustrating a comparative example.

Referring now to FIG. 7, a description is given of a comparative example.

For example, instead of Equation (2), Equation (3) may be calculated as below.

$$X2B = X2 \times C1 \quad (3)$$

Equation (3) indicates an example of calculating a comparative pattern distance X2B. Different from Equation (2), the second correction value C2 is not used in Equation (3). The following correction is performed, for example, with the pattern distance X2B calculated.

FIG. 7 is a diagram illustrating a comparative example.

Compared with the corrected image illustrated in FIG. 5, FIG. 7 illustrates an image corrected with the comparative pattern distance X2B and a comparative second dimension XP2B in the X-axis direction of the second image IMG2.

In such a configuration, for example, since the first side P1 has no correction reference, the read size may deviate due to an error of the scanner. Therefore, the first side and the second side may be misaligned, resulting in variation in size of the images formed.

Now, a description is given of a second embodiment of the present disclosure.

The second embodiment is different from the first embodiment in that the correction value is determined for each direction, type, or size of recording medium and that the correction unit 105 of the image reading device 10 performs correction for each direction, type, or size of recording medium. Hereinafter, the difference will be mainly described, and a redundant description will be omitted. For example, the second correction value is input as presented below in Table 1.

TABLE 1

| | CORRECTION VALUE FOR CONVEYANCE DIRECTION | CORRECTION VALUE FOR ORTHOGONAL DIRECTION |
|---|---|---|
| SHEET TYPE 1 | α1 | β1 |

TABLE 1-continued

| | CORRECTION VALUE FOR CONVEYANCE DIRECTION | CORRECTION VALUE FOR ORTHOGONAL DIRECTION |
|---|---|---|
| SHEET TYPE 2 | α2 | β2 |
| ... | ... | ... |
| SHEET TYPE N | αN | βN |

Table 1 presents an example in which the second correction value is set individually for each direction and type of recording medium. Specifically, in Table 1, sheet types 1 to N indicate "N" number of types of recording medium. Therefore, the correction value is input individually for each of the sheet types 1 to N.

Examples of the "sheet type" includes, but are not limited to, coated paper and plain paper. Note that recording media having different thicknesses, for example, may be classified into different sheet types. For example, the "sheet type" is associated with the type of recording medium prepared for each of input trays that load different types of recording media. In a case in which the setting indicating such an association is made in advance, different correction values are used for different "sheet types."

For example, a distance between an optical system (such as a sensor) used for reading and a first recording medium may be different from a distance between the optical system and a second recording medium having a thickness different from the thickness of the first recording medium. To accurately read images of the recording media having different thicknesses, the reading magnification is individually adjusted according to the thickness of the recording media.

The thickness of copy paper is from about 0.07 mm to about 0.3 mm. The thickness varies depending on the sheet type. On the first side and the second side, the distance between the optical system and the recording medium varies depending on the thickness of the recording medium. That is, different thicknesses or types of recording medium may vary the magnification.

The type of recording medium may be classified in consideration of, e.g., the weight of recording medium or the surface type of recording medium. For example, the gripping force, friction coefficient, or conveyance speed of conveyance rollers that are used for conveying the recording media may vary depending on the weight of recording medium or the surface type of recording medium. Therefore, the recording media having different weights or surface types may be classified into different sheet types in consideration of the parameters that affect, e.g., the gripping force, friction coefficient, or conveyance speed of the conveyance rollers.

Table 1 is also an example in which the second correction value is set individually for each of the conveyance direction and an orthogonal direction orthogonal to the conveyance direction. Specifically, in Table 1, a correction value "α" is input as a second correction value for the conveyance direction"; whereas a correction value "β" is input as a second correction value for the orthogonal direction.

For example, "α1" is used for correction for the conveyance direction for "sheet type 1." On the other hand, "β1" is used for correction for the orthogonal direction for "sheet type 1." Thus, in response to an input of a correction value for the conveyance direction and a correction value for the orthogonal direction different from the correction value for the conveyance direction, the correction unit 105 of the image reading device 10 performs a correction for the conveyance direction and a correction for the orthogonal direction different from the correction for the conveyance direction.

In the orthogonal direction, a magnification error in reading occurs. On the other hand, in the conveyance direction, a deviation may occur in the conveyance speed. That is, the cause of error varies depending on the direction. Therefore, different corrections may be preferably performed for the conveyance direction and the orthogonal direction from each other, depending on the cause of error. In response to an input of a correction value for the conveyance direction and a correction value for the orthogonal direction different from the correction value for the conveyance direction, the correction unit 105 of the image reading device 10 performs a correction for the conveyance direction and a correction for the orthogonal direction different from the correction for the conveyance direction. In short, the correction unit 105 of the image reading device 10 accurately performs the individual correction for the conveyance direction and for the orthogonal direction.

Note that the first correction value may be also determined individually for each direction, type, or size of recording medium.

Now, a description is given of a third embodiment of the present disclosure.

The third embodiment is different from the first embodiment in that a correction value is generated or input based on measured values as described below. Hereinafter, the difference will be mainly described, and a redundant description will be omitted.

Figure 8:
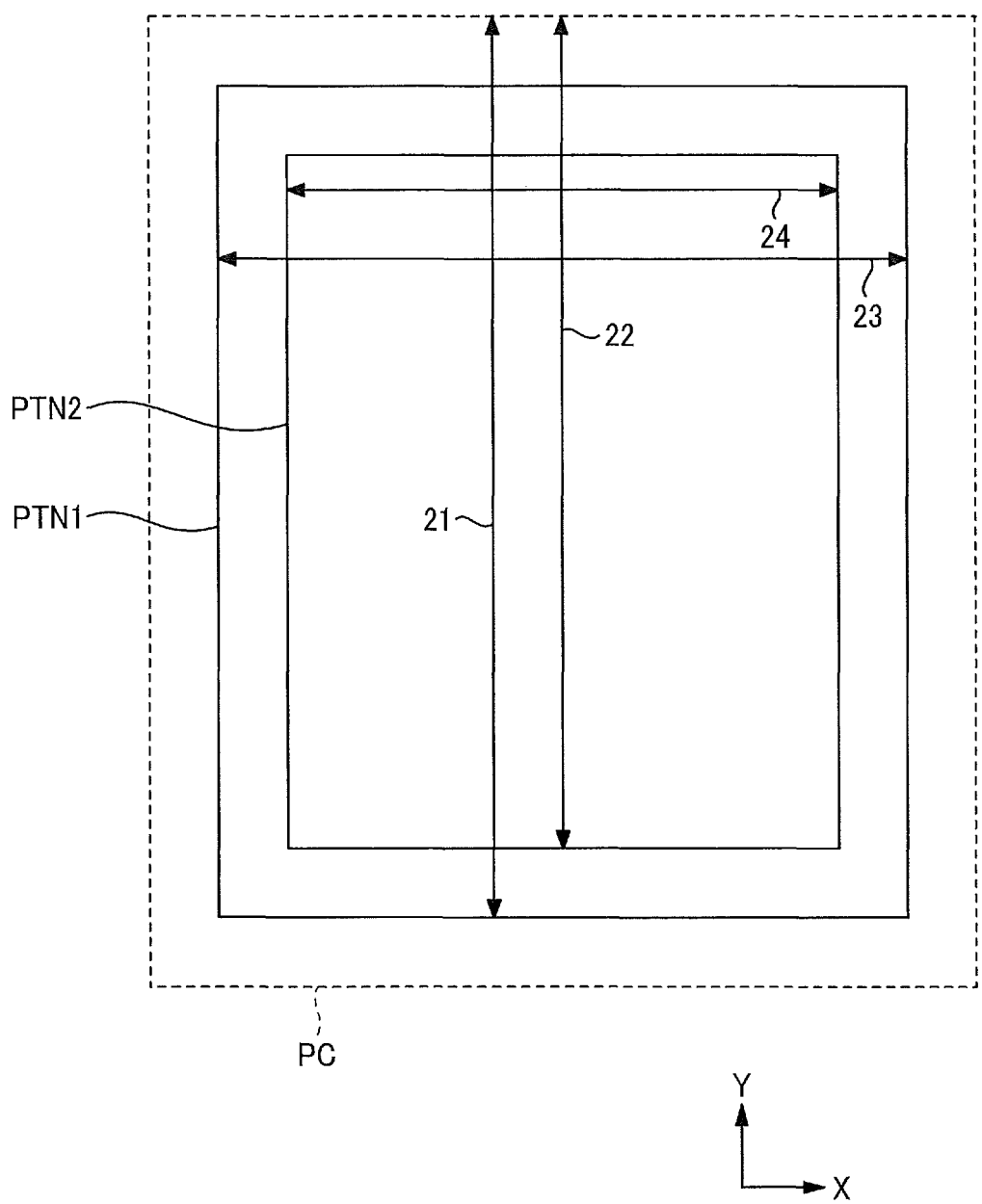
FIG. 8 is a diagram illustrating a first example of measured values used for correction according to an embodiment of the present disclosure.

FIG. 8 is a diagram illustrating a first example of measured values used for correction.

A description is now given of a case, as an example, in which the results of measuring a pattern indicating a size of A3 (297 mm×420 mm; the size defined by International Organization for Standardization (ISO) 216) and a pattern indicating a size of A4 (210 mm×297 mm; the size defined by ISO 216) is input as measured values.

In such a case, a recording medium having a size larger than the size of A3 is used. A description is now given of a case, as an example, in which an A3 sized pattern PTN1 and an A4 sized pattern PTN2 are drawn in advance on a sheet PC having a size of SRA3 (320 mm×450 mm; the size defined by ISO 217).

For example, in the case of correction in the Y-axis direction, input is a measured value of a dimension in the Y-axis direction based on the A3 sized pattern PTN1. Specifically, for example, a value obtained by measuring the distance from the upper end portion of the sheet PC to the lower end portion of the A3 sized pattern PTN1 is input as a "first measured value 21" illustrated in FIG. 8. Similarly, a value obtained by measuring the distance from the upper end portion of the sheet PC to the lower end portion of the A4 sized pattern PTN2 is input as a "second measured value 22" illustrated in FIG. 8.

By contrast, in the case of correction in the X-axis direction, input is a measured value of a dimension in the X-axis direction based on the A3 sized pattern PTN1. Specifically, a value obtained by measuring the distance between opposed end portions of the A3 sized pattern PTN1 is input as a "third measured value 23" illustrated in FIG. 8. Similarly, a value obtained by measuring the distance between the opposed end portions of the A4 sized pattern PTN2 is input as a "fourth measured value 24" illustrated in FIG. 8.

The size of a recording medium to be used is set before image formation. In the present example, in a case in which an A4 or A3 sized recording medium is used, the size indicated by the reading result is compared with the size indicated by the measured value. The second correction value is generated so as to fill the difference between the reading result and the measured value.

Note that the measured value may be a value obtained by measuring the parts described below with reference to FIG. 9, for example.

Figure 9:
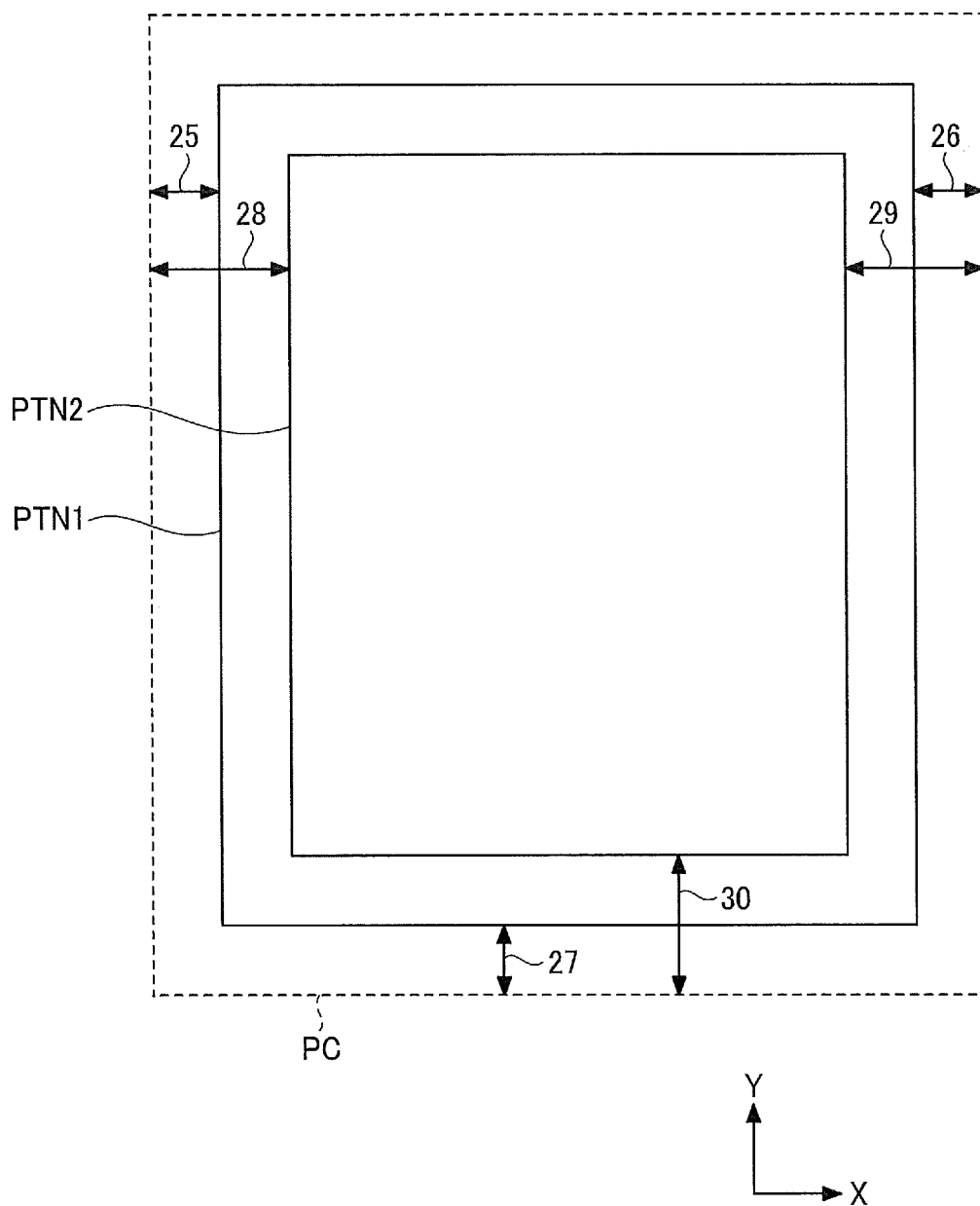
FIG. 9 is a diagram illustrating a second example of measured values used for correction.

FIG. 9 is a diagram illustrating a second example of measured values used for correction.

For example, the measured values may be a fifth measured value 25, a sixth measured value 26, and a seventh measured value 27 for the size of A3. Similarly, the measured values may be an eighth measured value 28, a ninth measured value 29, and a tenth measured value 30 for the size of A4.

As described above, the measured value may be a value obtained by measuring a distance with reference to a part of a predetermined pattern, a distance with reference to an end portion of a recording medium, or a combination thereof. Preferably, a plurality of parts is measured even in the same direction and size to obtain a plurality of measured values of such parts, such as the fifth measured value 25 and the sixth measured value 26.

For example, the error caused by uneven conveyance or bending of the optical system may vary depending on the position. By use of a plurality of measured values as illustrated in FIG. 9, even a local error is accurately corrected.

When both the reading result and the measured value are obtained, the correction value is generated or input with the measured value being "true." Note that the correction value may be generated or input for each scanner according to the method as illustrated in Table 2 below, for example.

recording medium is compared with a result of reading the pattern drawn on the first side. Thus, the second correction value is generated for the first side. On the other hand, a result of measuring a pattern drawn on a second side of the recording medium is compared with a result of reading the pattern drawn on the second side. Thus, the second correction value is generated for the second side.

As described above, the pattern and the correction value for the first side of the recording medium may be different from the pattern and the correction value for the second side of the recording medium. In this case, the correction unit 105 of the image reading device 10 performs a correction for the first side of the recording medium and a correction for the second side of the recording medium different from the correction for the first side of the recording medium.

Now, a description is given of a fourth embodiment of the present disclosure.

In the fourth embodiment, a chart is used as described below, for example.

The image forming apparatus 100 forms an image of a chart, which is input in advance, on a recording medium and outputs the image. Then, a user measures a given part of the chart with a scale and inputs the measurement result as a measured value. Thus, the measured value may be input. In this case, the correction unit 105 of the image reading device 10 performs correction based on the measured value of the chart formed on the recording medium.

In a case in which the chart is formed as an image as described above, the correction value is easily generated or input even when a new type of recording medium is loaded or even when an input tray is changed, for example.

In a case in which a user directly inputs a correction value, it often takes time and effort for the user to calculate the correction value. To address such a situation, the user inputs a measured value obtained by measuring a chart including a

TABLE 2

| CASE | FIRST SCANNER | SECOND SCANNER |
| --- | --- | --- |
| COMMON SIZE FOR BOTH SIDES | COMPARE RESULT OF READING MADE BY FIRST SCANNER WITH MEASURED VALUE AND GENERATE CORRECTION VALUE FOR FIRST SCANNER | COMPARE RESULT OF READING MADE BY SECOND SCANNER WITH MEASURED VALUE AND GENERATE CORRECTION VALUE FOR SECOND SCANNER |
| INDIVIDUAL SIZE AND PATTERN FOR EACH SIDE | COMPARE RESULT OF READING MADE BY FIRST SCANNER WITH MEASURED VALUE ON FIRST SIDE AND GENERATE CORRECTION VALUE FOR FIRST SCANNER | COMPARE RESULT OF READING MADE BY SECOND SCANNER WITH MEASURED VALUE ON SECOND SIDE AND GENERATE CORRECTION VALUE FOR SECOND SCANNER |

A case of determining "common size for both sides" in Table 2 above is employed when the recording medium is paper, for example. In a case in which the recording medium is paper, the shape of the front side of the recording medium is identical to the shape of the back side of the recording medium. That is, the size is the same on both sides of the recording medium. In this case, on the second side, the result of reading made by the second side reading unit 102 is compared with the measured value. Thus, the second correction value is generated.

By contrast, a case of determining "individual size and pattern for each side" is employed when a pattern is drawn on a recording medium other than paper, for example. A result of measuring a pattern drawn on a first side of the given dimension. This case prevents the user from calculating the correction value and enhances the usability.

In a case in which images are formed on both sides of a recording medium, that is, the first side (herein referred to as a "front" side) and the second side (herein referred to as a "back" side) of the recording medium, the magnification for forming the image on the back side of the recording medium may be adjusted with reference to the position of the image that is formed on the front side of the recording medium. For example, first, a chart is formed on each of the front side of a recording medium and the back side of the recording medium. Next, a user measures identical parts of the charts formed on the front side of the recording medium and the back side of the recording medium, respectively. Note that the identical parts are parts having the same measured value on the front side of the recording medium and the back side of the recording medium when the charts are formed without any error. The user then inputs the measured values of the identical parts of the charts formed on the front side of the recording medium and the back side of the recording medium, respectively. Thus, when the identical parts of the charts formed on the front side of the recording medium and the back side of the recording medium, respectively, are measured, the misalignment between the front side of the recording medium and the back side of the recording medium is specified from the measured values. In this case, for example, a correction value is calculated to form an image on the back side of the recording medium such that the image position on the back side is identical to the image position on the front side serving as a reference position. As described above, in a case in which a chart is formed on each side of a recording medium, the correction unit 105 of the image reading device 10 performs correction to adjust a difference between the front side of the recording medium and the back side of the recording medium, based on a measured value of one of the chart formed on one side (e.g., the first side) of the recording medium and the chart formed on the other side (e.g., the second side) of the recording medium.

Now, a description is given of a fifth embodiment of the present disclosure.

The fifth embodiment is applied to a case in which an image is formed on one side of a recording medium. Such a case includes a "face-up" method and a "face-down" method. In the "face-up" method, a recording medium subjected to image formation with a side targeted for image formation facing upward is ejected onto an output tray. In the "face-down" method, a recording medium subjected to image formation with a side targeted for image formation facing downward is ejected onto an output tray.

For example, in the case of "face-down" method, the front side (i.e., the upper side facing the first scanner SC1 in FIG. 1) of a recording medium may be read and used for calculation of the correction value. On the other hand, the image used for image formation is an image generated based on a result of reading the back side (i.e., the lower side facing the second scanner SC2 in FIG. 1) of the recording medium. Accordingly, the image to be formed on the back side may be corrected with the correction value generated and input based on the results of reading the front side of the recording medium and the back side of the recording medium.

Similarly, in the case of "face-up" method, a result of reading the back side of a recording medium may be used in the calculation of the correction value.

Now, a description is given of a sixth embodiment of the present disclosure.

Figure 10:
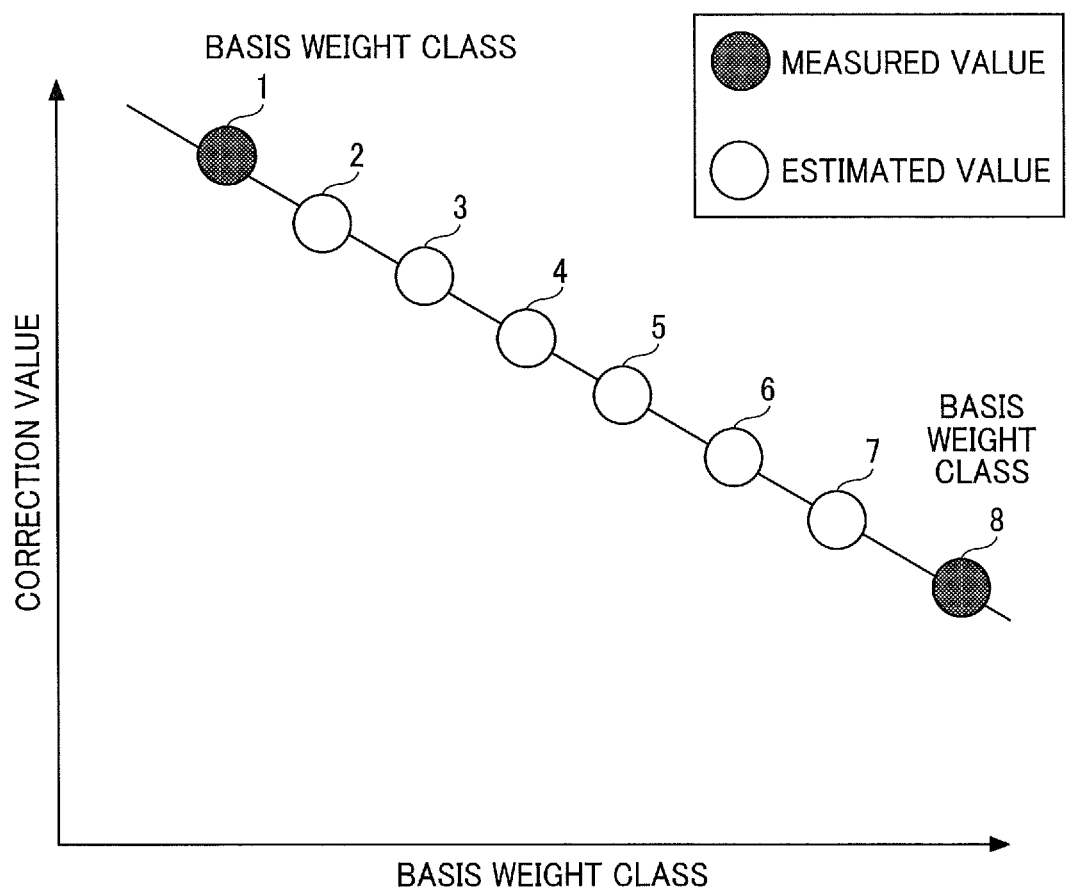
FIG. 10 is a graph of a first example of calculation of a correction value for each basis weight class according to an embodiment of the present disclosure.
Figure 11:
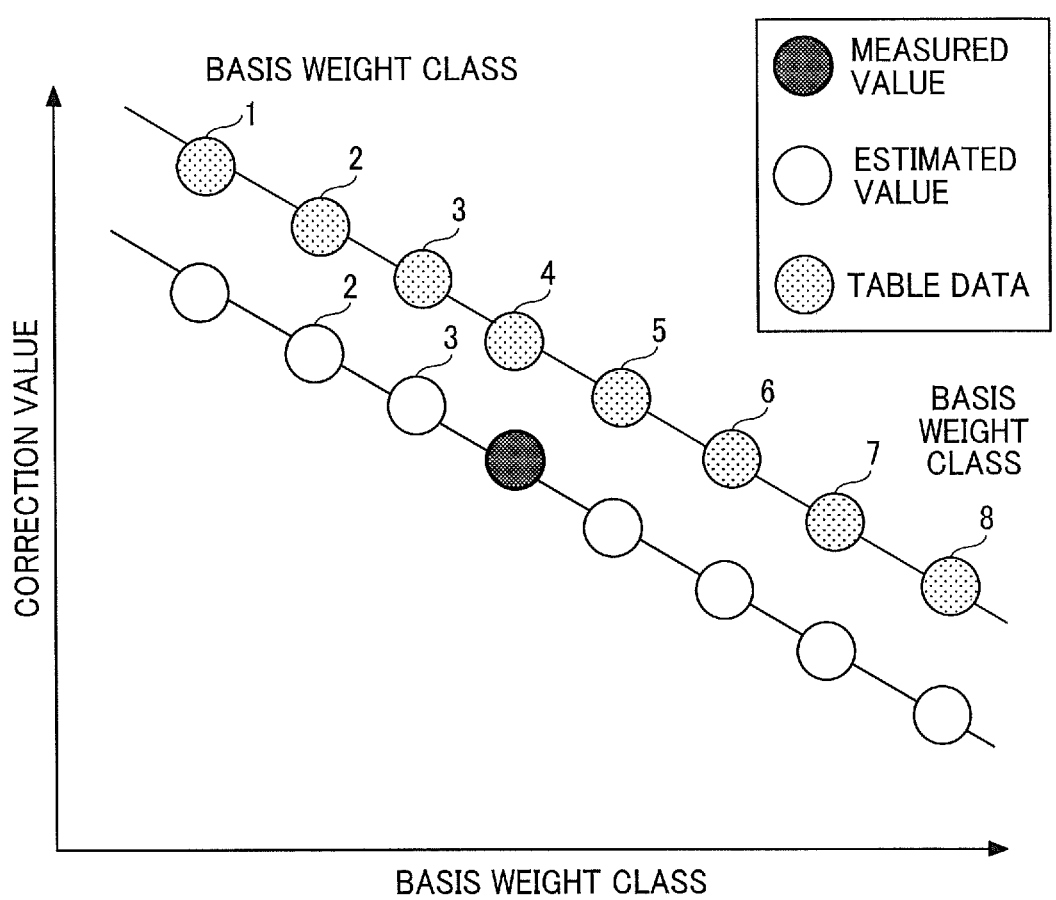
FIG. 11 is a graph of a second example of the calculation of the correction value for each basis weight class.

In the sixth embodiment, a correction value is calculated for each basis weight class, with reference to Table 3 and FIGS. 10 and 11.

Table 3 presents an example of correction values for each basis weight class. The "basis weight class" is an example of the "type of recording medium."

TABLE 3

| | MAIN-SCANNING CORRECTION VALUE | SUB-SCANNING CORRECTION VALUE |
|---|---|---|
| BASIS WEIGHT CLASS 1 | α1 (MEASURED VALUE) | β1 (MEASURED VALUE) |
| BASIS WEIGHT CLASS 2 | α2 (ESTIMATED VALUE) | β2 (ESTIMATED VALUE) |
| ... | ... | ... |
| BASIS WEIGHT CLASS N-1 | αN-1 (ESTIMATED VALUE) | βN-1 (ESTIMATED VALUE) |
| BASIS WEIGHT CLASS N | αN (MEASURED VALUE) | βN (MEASURED VALUE) |

Table 3 is retained by the retaining unit 107 of the image reading device 10. For example, the retaining unit 107 retains the correction value for each type of recording medium. In the present example, Table 3 presents N number of basis weight classes together with a correction value for the main scanning direction and a correction value for the sub-scanning direction for each of the N number of basis weight classes. Hereinafter, such a correction value for the main scanning direction and a correction value for the sub-scanning direction are referred to as a main-scanning correction value and a sub-scanning correction value, respectively. The main-scanning correction value is a correction value for a direction orthogonal to the conveyance direction in which a recording medium is conveyed. The sub-scanning correction value is a correction value for the conveyance direction. In Table 3, measured values are set as the main-scanning correction value and the sub-scanning correction value for each of two basis weight classes: Basis weight class 1 and Basis weight class N. On the other hand, in Table 3, estimated values are set as the main-scanning correction value and the sub-scanning correction value for the other basis weight classes: Basis weight classes 2 to N-1. The estimated values are values estimated from the correction values (i.e., the measured values) for the two basis weight classes: Basis weight class 1 and Basis weight class N. These estimated values are calculated by the calculation unit 106 of the image reading device 10. In other words, the calculation unit 106 calculates, based on a correction value for a first type of recording medium, a correction value for another type of recording medium. As described above, in the image reading device 10 of the present embodiment, a measured value is set as a correction value for a part of basis weight classes; whereas an estimated value calculated from the measured value is set as a correction value for another part of the basis weight classes. That is, the measured values are obtained for not all the basis weight classes. Accordingly, the image reading device 10 of the present embodiment reduces the load on users.

FIG. 10 is a graph of a first example of calculation of a correction value for each basis weight class.

FIG. 10 illustrates an example in which correction values are set, based on measured values for two of eight basis weight classes, for the rest of the eight basis weight classes. For example, in a case in which a mechanical weighing capacity is from about 50 g/m$^2$ to about 450 g/m$^2$, weighing ranges are as follows. For example, Basis weight class 1 is from about 50 g/m$^2$ to about 100 g/m$^2$. Basis weight class 2 is from about 100 g/m$^2$ to about 150 g/m$^2$. Basis weight class 3 is from about 150 g/m$^2$ to about 200 g/m$^2$. Basis weight class 8 is from about 400 g/m$^2$ to about 450 g/m$^2$.

For example, in the example illustrated in FIG. 10, a measured value is set as a correction value for each of Basis weight classes 1 and 8. On the other hand, in the example illustrated in FIG. 10, an estimated value is set as a correction value for each of Basis weight classes 2 to 7. Note that the estimated value is a value calculated based on the correction value for Basis weight class 1 and the correction value for Basis weight class 8. For example, in the example illustrated in FIG. 10, the correction value for each of Basis weight classes 2 to 7 are estimated on the assumption that the correction values change linearly.

That is, the measured values are obtained for not all the basis weight classes. Accordingly, the image reading device 10 of the present embodiment reduces the load on users.

Note that, in the present embodiment, instead of the "basis weight class," e.g., the "thickness of recording medium" or the "size of recording medium" may be used as the "type of recording medium." Although the correction values for the two basis weight classes are measured values in the present example, correction values for three or more basis weight classes may be measured values in the present embodiment. Accordingly, the correction values (i.e., the estimated values) for the other basis weight classes are calculated with an enhanced accuracy.

In the example illustrated in FIG. 10, the correction value for the minimum basis weight class (i.e., Basis weight class 1) and the correction value for the maximum basis weight class (i.e., Basis weight class 8) are measured values. However, correction values for other basis weight classes may be measured values. For example, the correction value for Basis weight class 2 and the correction value for Basis weight class 7 may be measured values. In this case, as in the example described above, the correction value for each of Basis weight classes 1, 3 to 6, and 8 may be estimated on the assumption that the correction values change linearly.

In the present embodiment, the correction value may be a correction value for correcting the speed of the conveyance rollers. In this case, the image reading device 10 may correct the speed of the conveyance rollers based on the correction value. Accordingly, the image reading device 10 can set the speed of the conveyance rollers to a given target value, and thus can set the reading length of a recording medium to a given target value.

FIG. 11 is a graph of a second example of the calculation of the correction value for each basis weight class.

FIG. 11 illustrates an example in which correction values are set, based on a measured value for one of eight basis weight classes as illustrated in FIG. 10 and table data indicating the correlation of the eight basis weight classes, for the rest of the eight basis weight classes.

For example, in the example illustrated in FIG. 11, a measured value is set as a correction value for Basis weight class 4. On the other hand, in the example illustrated in FIG. 11, an estimated value is set as a correction value for each of Basis weight classes 1 to 3 and 5 to 8. Note that the estimated value is a value calculated based on the correction value for Basis weight class 4 and the table data. For example, in the example illustrated in FIG. 11, the correction value for each of Basis weight classes 1 to 3 and 5 to 8 is estimated based on the table data indicating the correlation that the correction values change linearly.

That is, the measured values are obtained for not all the basis weight classes. Accordingly, the image reading device 10 of the present embodiment reduces the load on users.

Although the correction value for Basis weight class 4 is a measured value in the example illustrated in FIG. 11, a correction value for another basis weight class may be a measured value in the present embodiment.

The correlation of basis weight classes indicated by the table data is obtained in advance in the design period or in the production process, for example. The table data is linked to the characteristics of the image reading device 10 such as the conveyance characteristics of the image reading device 10 (e.g., the diameter of conveyance rollers and motor variation), a gap between the first scanner SC1 and a recording medium, and a gap between the second scanner SC2 and a recording medium. Therefore, the table data is preferably managed together with the image reading device 10 and retained by the image reading device 10. However, in a case in which the image reading device 10 is used as a post-processing peripheral device of the image forming apparatus 100 as in the present embodiment, the table data may be managed together with the image forming apparatus 100 and retained by the image forming apparatus 100.

For example, in the example illustrated in FIG. 11, the correlation of Basis weight classes 1 to 8 is obtained in advance in the design period or in the production process, for example, and stored as table data. The image reading device 10 obtains a measured value (e.g., the length of recording medium or the distance between patterns) for Basis weight class 4 during actual operation and calculates the correction value for Basis weight class 4 based on the measured value. Accordingly, even when various conditions (e.g., temperature and humidity and the type of recording medium) during actual operation change from various conditions at the time of generation of the table data, the image reading device 10 calculates an appropriate correction value for Basis weight class 4 according to the various conditions during the actual operation. The image reading device 10 calculates the correction value for each of Basis weight classes 1 to 3 and 5 to 8 based on the measurement-based correction value for Basis weight class 4 and the table data. That is, the image reading device 10 calculates an appropriate correction value for each of Basis weight classes 1 to 3 and 5 to 8 according to the various conditions during the actual operation. Note that, when the table data is generated, a type of recording medium frequently used is preferably applied to further reduce the errors due to the basis weight.

Figure 12:
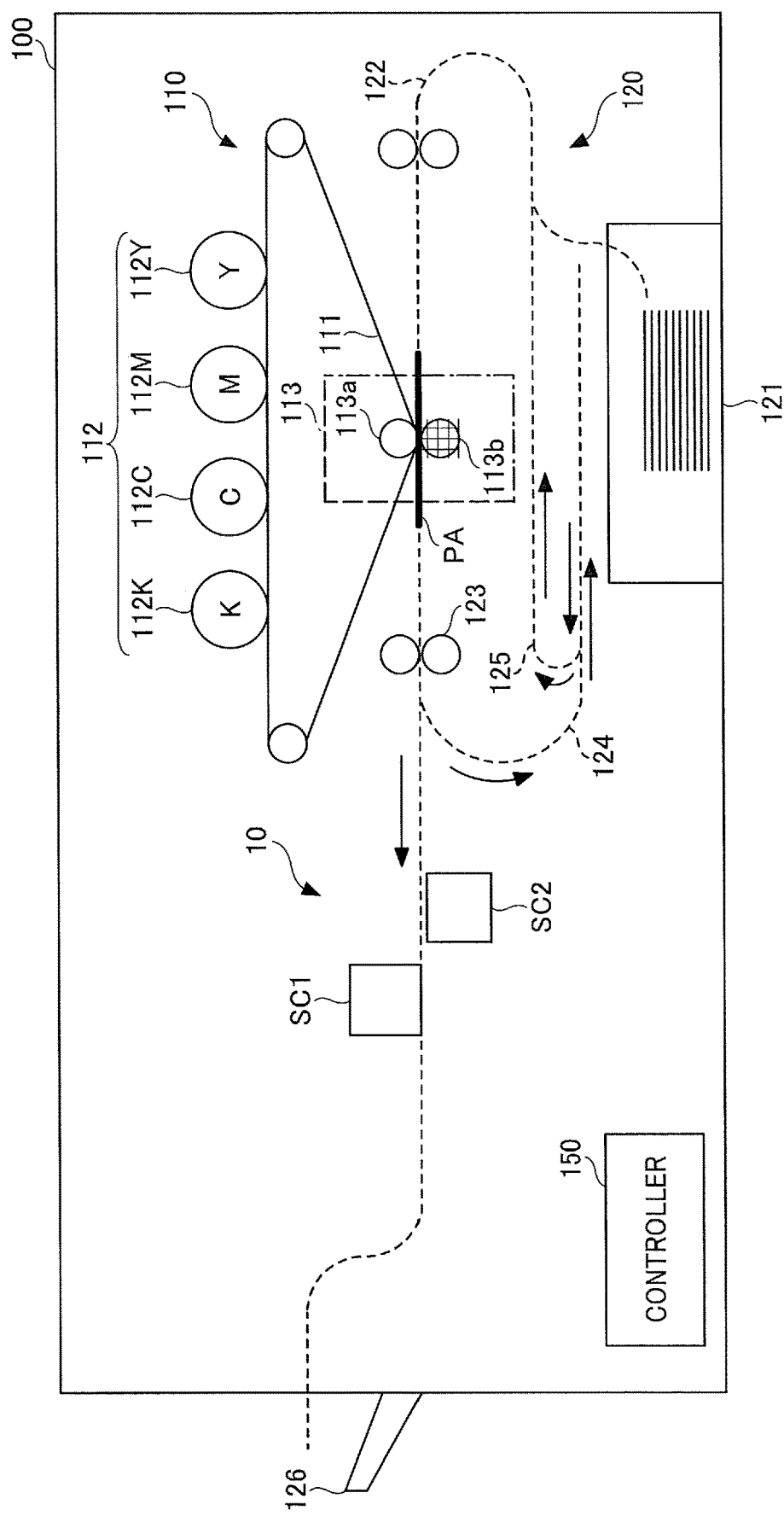
FIG. 12 is a diagram illustrating a configuration of an image forming apparatus according to an embodiment of the present disclosure.

Referring now to FIG. 12, a description is given of a configuration of the image forming apparatus 100 according to an embodiment of the present disclosure.

FIG. 12 is a diagram illustrating an example of the configuration of the image forming apparatus 100.

As illustrated in FIG. 12, the image forming apparatus 100 includes at least the image forming device 110, a medium conveying device 120, the image reading device 10, and a controller 150.

The image forming device 110 includes drum-shaped photoconductors 112 (namely, photoconductors 112K, 112C, 112M, and 112Y) to form latent images corresponding to different color images. Specifically, the photoconductors 112Y, 112M, 112C, and 112K are arranged to form an image with an image forming material (e.g., toner) of different colors, namely, yellow (Y), magenta (M), cyan (C), and black (K), respectively.

The photoconductors 112 are arranged along an intermediate transfer belt 111, which is an endless moving member. The intermediate transfer belt 111 is entrained around at least one driving roller and a plurality of driven rollers. The intermediate transfer belt 111 moves between a plurality of primary transfer positions and a secondary transfer position. At the primary transfer positions, images (e.g., toner images) developed on the respective photoconductors 112 are transferred onto the intermediate transfer belt 111. At the secondary transfer position, the images (e.g., the toner images) are transferred onto the sheet PA.

A transfer device 113 is disposed at the secondary transfer position. The transfer device 113 includes a transfer roller 113a and an opposed roller 113b disposed opposite the transfer roller 113a. The transfer device 113 transfers the images (e.g., the toner images) from the intermediate transfer belt 111 onto the sheet PA at once. Thus, a composite image is formed at a given position on the sheet PA. A gap is formed between the transfer roller 113a and the opposed roller 113b, allowing the intermediate transfer belt 111 and the sheet PA to pass through the gap while being sandwiched between the transfer roller 113a and the opposed roller 113b. The image is transferred onto the sheet PA conveyed through the gap in the conveyance direction (i.e., the sub-scanning direction) while being sandwiched between the transfer roller 113a and the opposed roller 113b.

The medium conveying device 120 includes a supply tray 121, a conveyance passage 122, a fixing roller 123, a conveyance passage switcher 124, and a reversing path 125. The supply tray 121 accommodates the sheet PA. The conveyance passage 122 is a passage along which the sheet PA is conveyed by a plurality of roller pairs disposed inside the image forming apparatus 100. That is, the conveyance passage 122 is defined by the plurality of roller pairs that conveys the sheet P. The fixing roller 123 is disposed downstream from the transfer device 113 in the conveyance direction.

At the time of executing a series of image forming processes, the controller 150 performs a given control process to cause, e.g., a pick up roller to separate the sheet PA from other sheets accommodated by the supply tray 121 so that the sheet PA is conveyed along the conveyance passage 122 to the transfer device 113.

When the sheet PA reaches the transfer device 113, a transfer process is performed. Specifically, the sheet PA is conveyed in the given conveyance direction while being sandwiched between the opposed roller 113b and an outer circumferential surface of the intermediate transfer belt 111 that is urged by the transfer roller 113a toward the opposed roller 113b. When the sheet PA passes between the intermediate transfer belt 111 and the opposed roller 113b, the image forming material on the surface of the intermediate transfer belt 111 is transferred onto the sheet PA. In the transfer process, an image is formed on one side (e.g., the first side P1) of the sheet PA.

The sheet PA bearing the image on the first side P1 is further conveyed to the fixing roller 123, which fixes the image onto the first side P1 of the sheet PA. After the image is fixed onto the first side P1 of the sheet PA, the sheet PA is conveyed to the conveyance passage switcher 124. The conveyance passage switcher 124 reverses the traveling direction of the sheet PA and conveys the sheet PA to the reversing path 125. Then, the sheet PA is conveyed again to the transfer position of the transfer roller 113a so that an image formed on the intermediate transfer belt 111 is transferred onto the other side (e.g., the second side P2) of the sheet PA.

The sheet PA bearing the image on the second side P2 is further conveyed to the fixing roller 123, which fixes the image onto the second side P2 of the sheet PA. After the image is fixed onto the second side P2 of the sheet PA, the sheet PA is conveyed to the image reading device 10.

The image reading device 10 includes the first scanner SC1 that reads the first side P1 of the sheet PA and the second scanner SC2 that reads the second side P2 of the sheet PA. After passing the image reading device 10, the sheet PA is ejected onto an output tray 126.

The controller 150 controls an overall operation of the image forming apparatus 100. The controller 150 controls a series of processes for forming an image on the sheet PA, which is a sheet-shaped recording medium.

A description is now given of variations.

An image that is formed on the first side of a recording medium may be a target of correction. For example, the image that is formed on the first side of the recording medium is corrected based on the second correction value. Thus, both the image that is formed on the first side of the recording medium and an image that is formed on the second side of the recording medium may be corrected.

The pattern PTN may have any shape, position, size, color, and number, for example, provided that the image forming apparatus 100 can obtain the pattern distance X2.

An object to be measured may be any image such as a pattern or a chart provided that the shape or the like is determined in advance. That is, the object may have any shape, color, and size, for example, provided that the object is a comparison target for calculation of an amount of deviation or difference such as magnification difference.

The image is a character, a number, a symbol, a design, a pattern, a color, a mark, a code, or a combination thereof formed on a recording medium. That is, the image may be any object provided that the image is readable by, e.g., a scanner.

In the embodiments described above, after the image forming apparatus 100 reads a printed image and ejects a recording medium bearing the image, a user measures the recording medium and inputs the measured value into the image forming apparatus 100. Alternatively, after the user measures the size of the recording medium inputs the measured value into the image forming apparatus 100, the image forming apparatus 100 may print and read the image and calculate the correction value. In this case, the image forming apparatus 100 may perform correction with the measured size of the recording medium in a case in which no pattern is formed on the recording medium.

A description is now given of other embodiments of the present disclosure.

Each of the above-described devices does not have to be a single device. For example, each of the above-described devices may be a combination of multiple devices. The image forming apparatus 100 may further include a device other than the devices illustrated in the accompanying drawings.

All or part of each process according to the embodiments of the present disclosure may be implemented by a program that causes a computer to execute an image reading method. That is, an arithmetic device and a control device included in the computer perform arithmetic and control, respectively, according to programs to execute the respective processes according to the programs. A storage device included in the computer stores data that is used for the processes according to the programs so that the computer executes the processes.

The programs may be recorded in a computer-readable storage or carrier medium and distributed. Note that examples of the storage or carrier medium include, but are not limited to, a magnetic tape, a flash memory, an optical disk, a magneto-optical disc, and a magnetic disk. The programs may be distributed through a telecommunication line.

The embodiments of the present disclosure may be implemented by an image reading system or an image forming system including a plurality of information processing devices. The image reading system or the image forming system may execute each processes and data storage in a redundant, distributed, parallel, or virtualized manner, or in a combination of such manners.

According to the embodiments of the present disclosure, variation in size of images formed are prevented.

Although the present disclosure makes reference to specific embodiments, it is to be noted that the present disclosure is not limited to the details of the embodiments described above. Thus, various modifications and enhancements are possible in light of the above teachings, without departing from the scope of the present disclosure. It is therefore to be understood that the present disclosure may be practiced otherwise than as specifically described herein. For example, elements and/or features of different embodiments may be combined with each other and/or substituted for each other within the scope of the present disclosure. The number of constituent elements and their locations, shapes, and so forth are not limited to any of the structure for performing the methodology illustrated in the drawings.

Any one of the above-described operations may be performed in various other ways, for example, in an order different from that described above.

Any of the above-described devices or units can be implemented as a hardware apparatus, such as a special-purpose circuit or device, or as a hardware/software combination, such as a processor executing a software program.

Further, each of the functions of the described embodiments may be implemented by one or more processing circuits or circuitry. Processing circuitry includes a programmed processor, as a processor includes circuitry. A processing circuit also includes devices such as an application-specific integrated circuit (ASIC), digital signal processor (DSP), field programmable gate array (FPGA) and conventional circuit components arranged to perform the recited functions.

Further, as described above, any one of the above-described and other methods of the present disclosure may be embodied in the form of a computer program stored on any kind of storage medium. Examples of storage media include, but are not limited to, floppy disks, hard disks, optical discs, magneto-optical discs, magnetic tapes, nonvolatile memory cards, read only memories (ROMs), etc.

Alternatively, any one of the above-described and other methods of the present disclosure may be implemented by the ASIC, prepared by interconnecting an appropriate network of conventional component circuits or by a combination thereof with one or more conventional general-purpose microprocessors and/or signal processors programmed accordingly.

What is claimed is:

1. An image reading device comprising:
   a first scanner configured to read a first side of a recording medium;
   a second scanner configured to read a second side of the recording medium;
   circuitry configured to:
      generate a first correction value to correct misalignment between the reading of the first side and the reading of the second side;
      set a second correction value; and
      correct an image based on the first correction value and the second correction value,
   wherein the set second correction value includes
      a third correction value for correcting the misalignment, between the reading of the first side and the reading of the second side, depending on a reading condition in which the recording medium is conveyed in a first direction, and
      a fourth correction value for correcting the misalignment, between the reading of the first side and the reading of the second side, depending on a reading condition in which the recording medium is conveyed in a second direction perpendicular to the first direction, and
   wherein the circuitry is configured to correct the image based on the first correction value, the third correction value, and the fourth correction value, such that the misalignment, between the reading of the first side and the reading of the second side, in each of the first direction and the second direction is corrected,
   wherein a plurality of third correction values and a plurality of fourth correction values are preset in association with each of types of recording mediums, and
   wherein the circuitry is configured to determine the third correction value and the fourth correction value, based on a type of the recording medium to be read.

2. The image reading device according to claim 1, wherein the circuitry is configured to generate the first correction value, based on a pattern formed on the second side, with a first dimension on the first side and a second dimension on the second side.

3. The image reading device according to claim 1, wherein one of the first correction value and the second correction value for a first type of the recording medium is different from the one of the first correction value and the second correction value for a second type of the recording medium and
   wherein the circuitry is configured to perform a correction for the first type of the recording medium and a correction for the second type of the recording medium different from the correction for the first type of the recording medium.

4. The image reading device according to claim 1, wherein one of the first correction value and the second correction value for a first size of the recording medium is different from the one of the first correction value and the second correction value for a second size of the recording medium, and
   wherein the circuitry is configured to perform a correction for the first size of the recording medium and a correction for the second size of the recording medium different from the correction for the first size of the recording medium.

5. The image reading device according to claim 1, wherein the circuitry is configured to generate the first correction value based on an input measured value of an object having a given size.

6. The image reading device according to claim 1, wherein the circuitry is configured to input the second correction value based on an input measured value of an object having a given size.

7. The image reading device according to claim 1, wherein one of the first correction value and the second correction value for the first side of the recording medium is different from the one of the first correction value and the second correction value for the second side of the recording medium, and
   wherein the circuitry is configured to perform a correction for the first side of the recording medium and a correction for the second side of the recording medium different from the correction for the first side of the recording medium.

8. The image reading device according to claim 1, wherein the circuitry is configured to perform correction based on a measured value of a chart formed on the recording medium.

9. The image reading device according to claim 1, wherein the circuitry is configured to perform correction based on a measured value of one of a chart formed on the first side of the recording medium and a chart formed on the second side of the recording medium.

10. The image reading device according to claim 1, further comprising:
a memory configured to retain the first correction value for each of a first type of the recording medium and a second type of the recording medium,
wherein the circuitry is configured to calculate, based on the first correction value for the first type of the recording medium, the first correction value for the second type of the recording medium.

11. The image reading device according to claim 10, wherein the first type of the recording medium is different from the second type of the recording medium in one of basis weight, thickness, and size.

12. An image forming apparatus comprising the image reading device according to claim 1.

13. An image reading device comprising:
a first scanner configured to read a first side of a recording medium to generate a first pattern image;
a second scanner configured to read a second side of the recording medium to generate a second pattern image;
circuitry configured to:
generate a first correction value to correct misalignment between the reading of the first side and the reading of the second side;
input a second correction value; and
correct an image based on the first correction value and the second correction value,
wherein the first correction value is a value indicating a ratio of an image size of the first pattern image generated by reading the first side of the recording medium to an image size of the second pattern image generated by reading the second side of the recording medium, and
wherein the second correction value is a value for correcting a difference between a magnification of the first scanner at which the first pattern image generated on the first side of the recording medium is read and a magnification of the second scanner at which the second pattern image generated on the second side of the recording medium is read.

14. The image reading device according to claim 1, wherein the circuitry is configured to
detect the type of the recording medium to be read, and
specify the third correction value and the fourth correction value that are in association with the detected type of the recording medium.

* * * * *